TAPE DRIVE CONTROL MECHANISM OF MAGNETIC TAPE RECORDERS

Filed May 16, 1966 2 Sheets-Sheet 1

INVENTOR
Katsuya ATSUMI
BY

ATTORNEY

TAPE DRIVE CONTROL MECHANISM OF MAGNETIC TAPE RECORDERS

Filed May 16, 1966

2 Sheets-Sheet 2

INVENTOR

BY Katsuya ATSUMI

ATTORNEY 3,373,913
Patented Mar. 19, 1968

3,373,913

TAPE DRIVE CONTROL MECHANISM OF MAGNETIC TAPE RECORDERS

Katsuya Atsumi, Tokyo, Japan, assignor to Akai Electric Company Limited, Tokyo, Japan
Filed May 16, 1966, Ser. No. 550,502
Claims priority, application Japan, May 17, 1965, 40/28,655
4 Claims. (Cl. 226—176)

ABSTRACT OF THE DISCLOSURE

A tape drive control mechanism for a magnetic tape recorder having a plurality of control buttons for controlling a capstan drive arrangement includes a pinch roll mounted on a pivotable arm and connected by linkage to one of the buttons. When the button is depressed the pinch roll moves to engage the capstan, the linkage operates a rotatable cam carrying wheel which in turn operates a switch controlling an electromagnet linked to the linkage. The electromagnet pulls the linkage to engage the pinch roll with the capstan and is held in this engagement by a spring loaded locking member operating on the button after the cammed wheel allows the electromagnet to be deenergized.

This invention relates to improvements in and relating to the tape drive control mechanism of magnetic tape recorders.

When the tape drive of a capstan drive type magnetic tape recording and reproducing machine, hereinafter briefly referred to as "tape recorder," is arranged for push button control, a pressure roll, frequently called a "pinch roll" by those skilled in the art, is brought into engagement with the capstan and must be kept in pressure contact with the capstan. This requires considerable effort in the course of regular recording or reproducing operation of the tape recorder.

When, in such a case, the urging operation for bringing the pinch roll into contact with the rotating capstan relies only upon the manual effort provided by the user of the tape recorder, by his depression of a push button which is mechanically linked with the pinch roll so as to advance it into its operating position, and to remove it therefrom upon release of the push button from its depressed position, the user will feel a considerable load during the later half period of his button-depressing manipulation, which means that a lighter and quicker manipulation of the button is prevented in effect from being brought about.

For avoiding this kind of drawback, it has been already proposed to fit tape recorders with electromagnetically operatable plungers so as to make the manual operation considerably easier and lighter. In the prior arrangement, however, the electromagnet was so designed and connected with current source that it is energized upon depression of the button. In this case, the electromagnet is kept electrically energized during the whole period of the recording or reproducing operation, as the case may be, emanating therefrom constantly magnetic stray fluxes which will adversely affect upon various other electric components of the tape recorder, even when neglecting the current loss caused thereby.

It is therefore the main object of the invention to provide an improved tape drive control mechanism for push-button controlled tape recorder, minimizing otherwise possible adverse effect by stray fluxes emanating from the electromagnetic plunger upon the functions of other electric constituents of the tape recorder.

A further object of the invention is to provide a control mechanism for push-button controlled tape recorder, capable of functioning in a lighter and smoother manner, with a minimum consumption of current.

These and further objects and advantages of the invention will be readily apparent from the following detailed description of a preferred embodiment thereof, shown by way of example in the accompanying drawings, in which.

Figure 2:
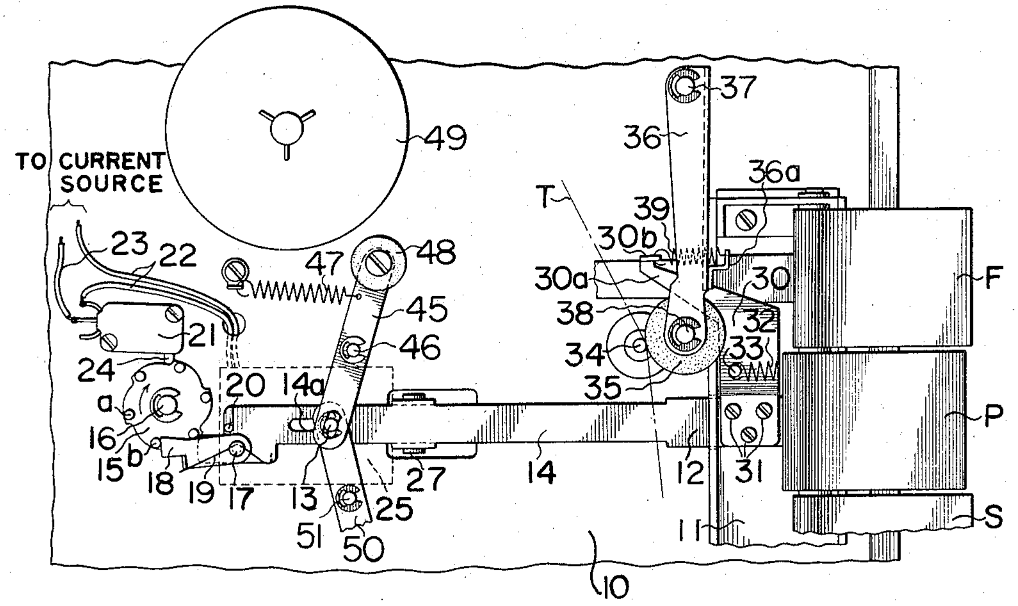
FIG. 2 is a similar view to FIG. 1, wherein, however, the capstan is functioning for the forward feed of a magnetic tape.

Now referring to the accompanying drawings, 10 denotes chassis panel of a tape recorder, only a part thereof being shown for simplicity of the drawing, which is fitted with the tape drive control mechanism according to this invention. At the right-hand side edge of the panel 10 when seen in FIGS. 1 and 2, there is provided a series of five control buttons, of which only three, or more specifically fast forward control button F, play or reproducing control button P and stop control button S are shown. Further there are record control and rewinding control buttons which are arranged in a row with said three buttons at the lower part of FIG. 1 or 2, respectively, although not shown, because these two have substantially no importance for understanding of the present invention.

Figure 3:
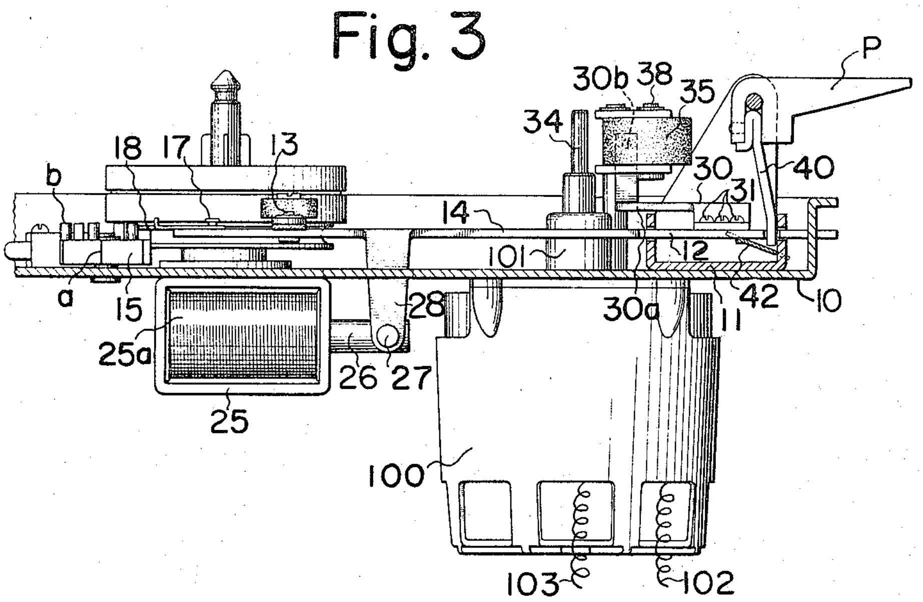
FIGS. 3 and 4 are partially sectioned side elevations corresponding to the states of the control mechanism according to this invention, shown in FIGS. 1 and 2, respectively.
Figure 4:
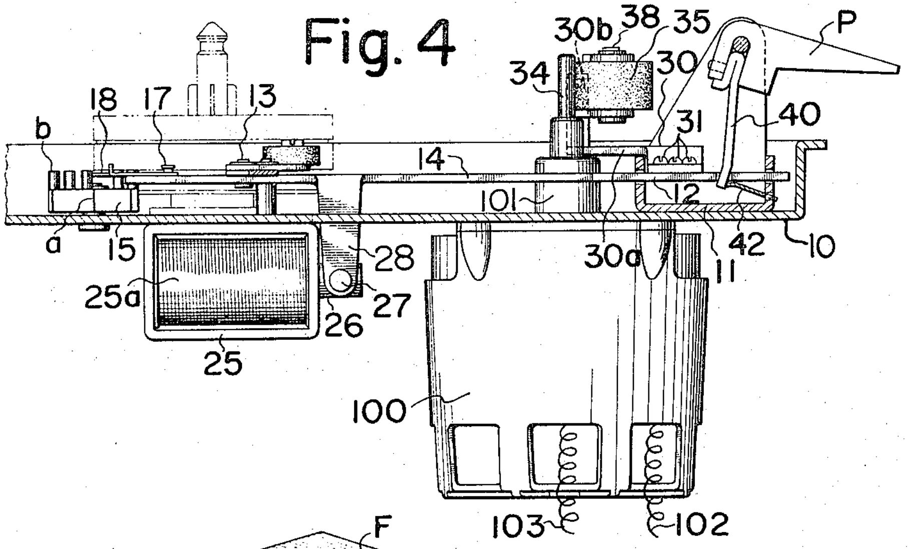

On panel 10, a support frame 11 is fixedly mounted and a slide 12 is slidably mounted in this frame, as most clearly seen from FIGS. 3 and 4. This slide 12 is so linked with play control button P that when the latter is depressed for initiating a playback operation from its off-service position shown in FIG. 1 to its operative position shown in FIG. 2, the slide is advanced from right to left, when seen in any of FIGS. 1–4. Motion transmission bar 14 is rigidly connected at its one end with slide 12 for performing unitary motion therewith and formed with an elongated slot at 14*a* which receives slidably a stationary guide pin 13 studded in the upper surface of panel 10, said pin-and-slot arrangement serving for guiding the bar 14 with slide 12 for the desired operating service, as will be more fully described hereinafter.

In close proximity of the free end of bar 14, an operating disc 15 is rotatably mounted on panel 10 about a pin 16 which is studded again in the upper surface thereof. The disc 15 is formed on its peripheral surface with a series of equidistantly distributed camming projections at *a*, each of the latter carrying thereon fixedly a feed pin *b*. These feed pins *b* are provided equidistantly along a circle with its center placed at the pin 16.

Figure 1:
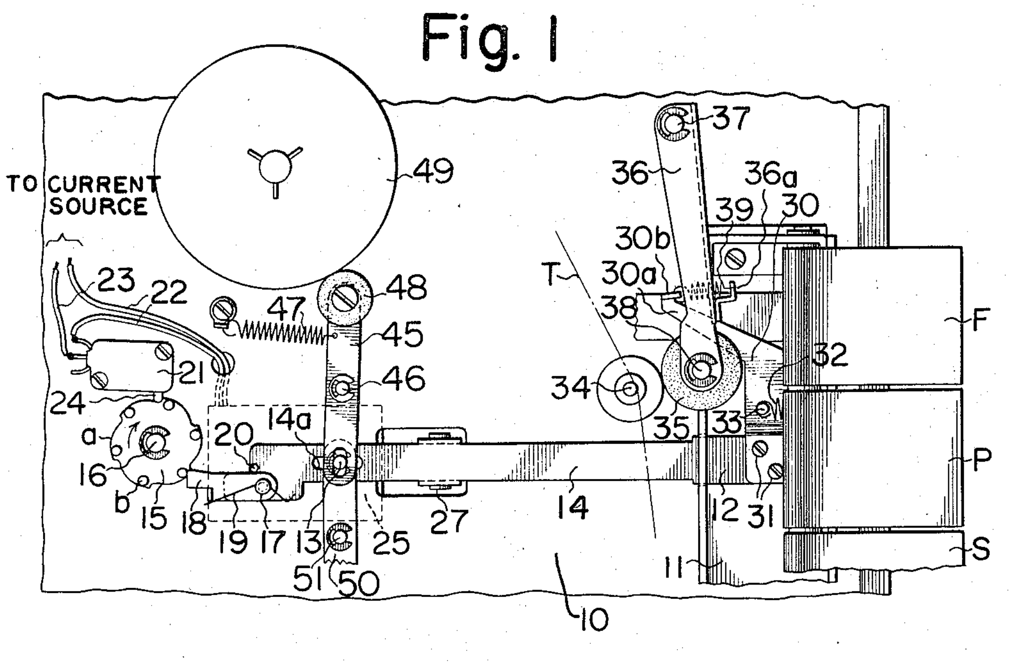
FIG. 1 is a top plan view of essential parts of the tape drive control mechanism embodying the principles of the invention, showing the state thereof wherein the capstan drive is kept in its non-operating position, or when expressed in terms of the operation of the tape recorder, while in stop position, fast forward drive service or fast rewinding service.

On the free end of operating bar 14, a pawl 18 is pivotably mounted about pin 17 studded on the bar and subjected to resilient urging force exerted by a spring 19 for rotating it in the clockwise direction when seen in FIG. 1 or 2, excessive rotation of the pawl being prevented by a stop pin 20 again studded on the bar.

The pawl 18 is normally kept in engagement with one of said feed pins *b* on the operating disc 15. Therefore, when motion-transmitting bar 14 is caused to advance in the aforementioned manner, the disc 15 is rotated one step which is equal to the angular distance between two neighboring feed pins *b*. In the embodiment shown, the disc is provided with six feed pins, and thus six intermittent feed movements of the disc will complete one revolution thereof.

In close proximity of disc 15, there is fixedly mounted a microswitch 21 on the panel 10, a switching button 24 of the switch being kept in pressure engagement with the periphery of disc 15 under the influence of a contained conventional spring, not shown. When the tape recorder is not operated, switching button 24 is kept in contact with one of the valleys formed between camming projections *a* and the microswitch is kept in its off-position. When the disc 15 is rotated in the manner to be described and a camming projection *a* is brought into contact with button 24 so as to move inward, the switch is turned "on" and thus current is supplied from a current source, not shown, through conductors 22–23 and switch 21 to the coil 25*a* of plunger assembly 25 which is most clearly seen in FIGS. 3 and 4. The assembly 25 is provided with plunger bar 26 which is so arranged that it is attracted from its off-service position shown in FIG. 1 to its working position shown in FIG. 2 upon the energization of coil 25*a*. Projecting arm 28 is formed at an intermediate point between the both end extremities of bar 14 and linked at its free end with the plunger bar 26 by means of a pivot pin 27. The root of a support 30 is fixedly attached to slide 12 by means of fixing screws 31, while a return tension spring 32 is attached with its one end to the support by means of pin 33 studded thereon. The other end of the spring is attached to an elongated side flange forming a part of supporting frame 11. This spring 32 serves for resetting the slide 12 together with push button P when released from their working position, as will be more fully described hereinafter.

Numeral 34 denotes conventional capstan shaft which is rotatably mounted in bearing 101 and adapted for being driven by capstan motor 100 suspended from panel 10 and supplied with current through conductors 102 and 103 from a current source, not shown, upon closure of a manual main switch, again not shown.

Conventional pinch roller 35 made from rubber or the like elastic and frictional material is rotatably mounted at 38 on the free end of support arm 36 which is pivotable about pivot pin 37 studded on panel 10. At an intermediate point nearer to the free end, a projection 36*a* is formed on arm 36 and a further projection 30*b* is formed integral with said support 30 at the free end 30*a* thereof, a spring 39 being tensioned between both projections 30*b* and 36*a*. Although arm 36 with pinch roll 35 is subjected to resilient urging force in the clockwise direction in FIG. 1, the rotational range of the arm is limited by the engagement of the side edge of the arm with the projection 30*b* acting in this case as an effective stop, the arm is kept normally in its off-service position shown in FIG. 1 and thus the pinch roll is positioned at its separated position from the capstan or the uppermost and most reduced part of shaft 34.

Brake arm 45 is pivotably mounted around pivot pin 46 which is studded on panel 10, and urged by a tension spring 47 to rotate in the counter clockwise direction in FIG. 1. Arm 45 is provided on its free end with a friction roll 48 normally kept in frictional engagement with a brake drum, not shown, which is formed concentrically with tape winding turn table 49. Table 49 carries detachably thereon a conventional tape reel, not shown, for winding up the tape T.

Although not shown, there is provided a further turn disc and brake drum similar to that of 49, for delivery of the tape T. The brake drum at the tape delivery side is also arranged to cooperate with a disengageable brake arm assembly similar to that denoted by 45–48. A link 50 is pivotably mounted at 51 on panel 10 and one end of the link is linked at 13 with brake arm 45. This link 50 is operatively connected through a plurality of link members, not shown, with the brake arm of the tape delivery side. As may be well supposed from a comparison of FIG. 1 with FIG. 2, when button P is depressed the brake arm 45 is disengaged from pressure contact with brake drum underneath of wind-up turn table, and vice versa. This operation mode applies also to the brake arm at the tape delivery side, as is commonly known with conventional tape recorders.

Figure 5:
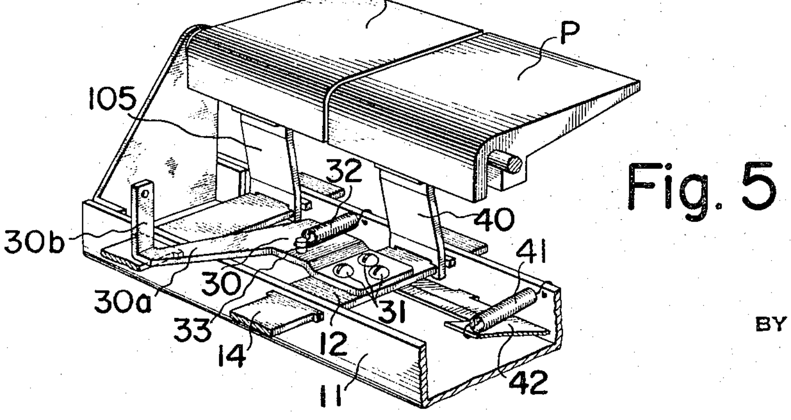
FIG. 5 is a perspective view of part of the push-button arrangement.

Now, when the reproducing control button P is depressed from its off-service position shown in FIGS. 1, 3 and 5, to its working position shown in FIGS. 2 and 4, slide 12 and bar 14 are advanced and pawl 18 acts with its tip end upon on of feed pins *b*, thereby disc 15 being caused to rotate a step and switch button 21 being pressed inward by one of the camming projections *a*, so as to make the microswitch 21 "on." The related parts are so dimensioned and arranged that the aforementioned actuation of switch 21 is carried into effect during the lower half of the depressing stroke of button P in which a considerably large manual resistance may be otherwise encountered. For this reason, each of the camming projections *a* has a gradually rising operating surface when seen in the rotational direction of disc 15.

With the advancing movement of slide 12 caused by the depressing manipulation of button P, support 30, connecting arm 28 and plunger bar 26 are also caused thereby to move in unison with the slide and thus the spring 39 being considerably tensioned. By this spring tension, arm 36 and thus pinch roll 35 are caused to move towards the capstan 34, and directly before contact of the roll with the capstan, the microswitch is turned "on," thereby current being supplied to the coil 25*a* of electromagnetic plunger assembly 25. Upon the energization of coil 25*a*, plunger 26 is attracted suddenly and pinch roll 35 is brought into pressure contact with capstan 34, thereby the desired cooperating condition between the both being effectively carried into effect and then maintained.

Nearer to the end of the button-depressing manipulation, stem 40 of button P acts with its lower end upon locker plate 42 so as to move the latter in FIGS. 3 and 5 in the counter clockwise direction, against the action of spring 41 and finally passes over the front edge of the plate, whereupon the button is automatically locked by the latter and kept in this position under the resilient action provided by spring 41 thus tensioned. After this locking stage and pressure contact of the pinch roll with the capstan, the switch button falls in the next valley or recess on the periphery of the operating disc 15 and is thus provisionally locked at this end of the manipulating step. Thus, the switch 21 is turned again to "off" and current to the electromagnetic coil 25*a* is interrupted. At this moment, however, the pinch roll is kept in pressure engagement with the capstan and therefore the desired reproducing operation can be carried into effect without hindrance, even if the plunger assembly is kept in its off-service position. It will be noted from the foregoing that the plunger assembly 25 acts, when operated, as a booster for bringing the pinch roll into pressure engagement with the capstan. Since, as is commonly known, the capstan is kept in rotation at a predtermined speed the tape T, only schematically shown in the drawing by a chain-dotted line, will be delivered as in the conventional way, and the reproducing operation is carried out in cooperation with conventional magnetic heads not shown.

When it is desired to disengage the pinch roll from the capstan and maintain the roll in its off-service position shown in FIG. 1, any one of other operation control buttons such as those denoted by F, S or the like, may be actuated so as to rotate the locker plate 42 still further in the forward direction from its locking position shown in FIG. 4. For this purpose, other control buttons are provided with actuating stems as was described hereinbefore of stem 40 in connection with button P and shown at 105 in FIG. 5 with reference to fast forward control button F. With this manipulation the stem 40 of button P is released from its locked position shown in FIG. 1. Therefore, arm 36 and operating bar 14 are shifted in unison with the slide back to their initial position under the action of return spring 32. Therefore, all the related parts will return to their initial position shown in FIG. 1, except the operating disc 15 which is of non-reversible design and adapted for unidirectional rotation as shown by a small arrow on the disc in the drawing. In place of the pin-wheel at 15, conventional rotary intermittent feed mechanism such as ratchet wheel mechanism or the like can be adopted with equal results.

From the foregoing, it will be clear that according to this invention the objects referred to hereinbefore can be realized without difficulty. It will be clear that the above-constructional and functional features may be embodied in connection with the record control button, in place of the reproducing control button P.

While the invention has been particularly shown and described with reference to substantially a preferred embodiment thereof, it will be understood by those skilled in the art that various changes in form and details may be made therein without departing from the spirit and scope of the invention.

What I claim is:

1. Tape drive control mechanism of a magnetic tape recording and reproducing machine with a plurality of control buttons and designed for the capstan tape drive type comprising; a rotatable capstan, a pinch roll mounted on a pivotable arm; a linkage operatively connected between one of said buttons and said arm, the pinch roll being adapted for selective engagement with said capstan upon depressing said one of the buttons, said mechanism being characterized by the provision of: a steppingly rotatable wheel having a plurality of camming means and mechanically coupled with a member of said linkage and adapted for rotation in one direction a predetermined rotational angle upon depressing said button; a switch operated by the camming means on the wheel and an electromagnetic plunger assembly having a coil and a plunger bar, said coil being electrically connected through said switch to a current source and said plunger bar being mechanically linked with said linkage, said plunger being actuated in the later half period of the button-depressing stroke and in the assisting direction for depressing said button.

2. Mechanism as set forth in claim 1, wherein said wheel is a pinned ratchet wheel.

3. Mechanism as set forth in claim 1, wherein said button is a reproducing control or recording control button.

4. Mechanism as set forth in claim 1, wherein a member of said linkage carries thereon a spring-loaded and pivotable pawl kept in operative engagement with said wheel.

References Cited

UNITED STATES PATENTS

| | | | |
|---|---|---|---|
| 2,927,743 | 3/1960 | Shatavsky | 226—176 X |
| 2,942,875 | 6/1960 | Pastor | 226—176 X |
| 2,953,312 | 9/1960 | Munroe | 226—176 X |
| 3,127,178 | 3/1964 | Osborne | 226—180 |

M. HENSON WOOD, Jr., *Primary Examiner.*

J. P. MULLINS, *Assistant Examiner.*